United States Patent [19]

Hicks

[11] Patent Number: 5,072,256
[45] Date of Patent: Dec. 10, 1991

[54] PHOTOGRAPHIC PRINTER MASK MECHANISM

[76] Inventor: Ray Hicks, 2605 Corunna Rd., Flint, Mich. 48503

[21] Appl. No.: 658,159

[22] Filed: Feb. 20, 1991

[51] Int. Cl.$^5$ ............................................. G03B 27/72
[52] U.S. Cl. ...................................................... 355/71
[58] Field of Search .......................................... 355/71

[56] References Cited

U.S. PATENT DOCUMENTS 4,191,466  3/1980  Gandini ................................ 355/71
4,479,713  10/1984  Long .................................. 355/71 X Primary Examiner—Richard A. Wintercorn
Attorney, Agent, or Firm—Krass & Young

[57] ABSTRACT

A mask mechanism which allows the dimensional adjustment of at least one of the exposure apertures associated with a photographic printer. The mask mechanism includes a substantially planar plate member that has a rectangular opening therethrough. A pair of movable gates are disposed on opposite sides of the rectangular opening and at least one pneumatic cylinder operates to move these gates between a first open position and a second restricted position. The gates include a substantially linear outer edges oriented parallel to one another to maintain the rectangular nature of the exposure aperture. Typically, the mask mechanism would take the form of a negative cropping riser block or a photographic paper mask assembly. In this manner, either, or both, the exposure aperture associated with the negative or the exposure aperture associated with the photographic paper as it relates to the overall photographic printer can be controlled, respectively. The gates are adapted to positively move between a plurality of positions using a plurality of pneumatic cylinders to move each of the moveable gates between a plurality of positions. At least one spring member operates to bias the pair of movable gates disposed on opposide sides of the rectangular opening toward the widest open positions, and at least one shaft operates to maintain the alignment of the pair of movable gates as the gates move between various positions.

26 Claims, 5 Drawing Sheets

PHOTOGRAPHIC PRINTER MASK MECHANISM

FIELD OF THE INVENTION

The present invention relates to photographic printers and, more specifically, to mask mechanisms for use with photographic printers which allow the dimensions of the exposure areas associated with the photographic printer to vary during operation of the photographic printer.

BACKGROUND OF THE INVENTION

Photographic printers typically include a combination of several basic components used in the printing process. A negative feed and holder assembly typically operates to store and transport an elongated strip of negative film images. The negative assembly also orients a single selected negative image proximate a negative aperture in a position for use in the printing process. A photographic paper feed and holder assembly typically operates to store and transport an elongated web of light sensitive photographic paper. The paper assembly also orients a selected area of the web proximate a paper aperture in a position for use in the printing process. A source of light operates to project light through the selected negative image onto the photographic paper. A lens, or group of lenses, positioned between the negative and photographic paper operates to focus and/or transmit the light onto the photographic paper to produce the desired image, or group of images. These basic components are typically housed in a framework that allows an operator to conveniently control the printing process.

Photographic printers typically take the form of either a "proof" or "package" photographic printer arrangement. As a basic distinction, a "proof" printer is adapted to print individual photographic prints from a given negative, while a "package" printer is adapted to simultaneously print a group of photographic prints from a single negative. More specifically, photographic proof printers typically produce a single 3.5×5 inch, 4×5 inch, or 5×5 inch photographic print and are used to initially verify the correct exposure levels for a given negative. Photographic package printers typically produce an 11×14 inch photographic sheet having either a single photographic image or a group of identical images of various sizes positioned thereon.

Using an exposure of a school student as an example, a "proof" printer would initially be used to print a single image, or a series of images at various exposure levels, of the child for use in initially reviewing the quality of the print. A "package" printer would thereafter be used to produce the multi-image sheets of photographs which parents purchase each year of their children's school pictures.

Operators of photographic printers are often confronted with the task of exposing the photographic prints from various size negative images. Existing printers are typically configured to print from only a single size negative at any given time. Such printers may expose photographic prints from other size negative images by manually changing corresponding negative mask or crop plates. To use these printers effectively, the various sized negatives must be sorted into groups of like-sized negatives and spliced together as individual strips of like-sized negatives for processing at separate times. Further, such printers are typically designed to expose only one size photographic prints from the negative images. Photographic paper mask or crop plates must be manually changed for the printing of corresponding prints of various sizes. Therefore, the negative strips must also be sorted into separate groups for the printing of like-sized prints.

There is a need in the industry to provide an efficient and inexpensive mechanism by which a variety of size photographic prints from a variety of sizes of photographic negative images without having to interrupt the operation of the photographic printer.

SUMMARY OF THE INVENTION

The present invention provides a mask mechanism which allows the dimensional adjustment of at least one of the exposure apertures associated with a photographic printer. The mask mechanism includes a substantially planar plate member that has a rectangular opening therethrough. A pair of movable gates are disposed on opposite sides of the rectangular opening and at least one pneumatic cylinder operates to move these gates between a first open position and a second restricted position. This arrangement allows the dimensions of the exposure aperture to controllably vary. More specifically, the dimension between the opposed sides of the rectangular opening having the movable gates associated therewith varies between an enlarged dimension, when the gates are disposed in the first open position, and a diminished dimension, when the gates are disposed in the second restricted position. The dimension of the exposure aperture between the opposed sides of the rectangular opening not having the movable gates associated therewith remains constant.

In the preferred embodiment, the moveable gates are disposed substantially coplanar with the plate member. This arrangement minimizes overall width and provides automatic alignment of the gates with respect to one another by virtue of the adjacent edges of the rectangular opening to maintain a rectangular aperture. Further in the disclosed embodiment, the gates include a substantially linear outer edges oriented parallel to one another to maintain the rectangular nature of the exposure aperture.

Typically, the mask mechanism would take the form of a negative cropping riser block or a photographic paper mask assembly. In this manner, either, or both, the exposure aperture associated with the negative or the exposure aperture associated with the photographic paper as it relates to the overall photographic printer can be controlled, respectively.

When the mask mechanism takes the form of a photographic paper mask assembly, one, or both, of the pair of movable gates may be adapted to support a device for marking the photographic paper relative to the exposed prints thereon. For example, a punch assembly for marking the photographic paper with punch holes or an optical marker for encoding the photographic paper with identifying information may be attached to one of the gates. This arrangement automatically adjusts the placement of the associated marks on the photographic paper in relation to the print image being exposed for consistent placement thereby.

In the preferred embodiment, the gates are adapted to positively move between a plurality of positions. Additional pneumatic cylinders are operative to accomplish this feature. For example, two pneumatic cylinders may operate to move each of the moveable gates between a first open position, a second restricted position, and a third further restricted position.

The plurality of pneumatic cylinders may operate in a number of different manners. A first cylinder of the at least two pneumatic cylinders may operate to move each of the moveable gates between the first open position and the second restricted position, and a second pneumatic cylinder of the at least two pneumatic cylinders may operate to move each of the moveable gates between the first open position and the third further restricted position. In this manner, each cylinder operates independently of the other cylinders.

Alternatively, the cylinders may operate at least a part of the time in concert with one another. For example, a first pneumatic cylinder of the at least two pneumatic cylinders may operate to move each of the moveable gates between the first open position and the second restricted position, and first and second pneumatic cylinders of the at least two pneumatic cylinders may operate jointly to move each of the moveable gates between the first open position and the third further restricted position. In this manner, the cylinders cooperate to extend the range of either individual cylinder. Conversely, the first and second pneumatic cylinders of the at least two pneumatic cylinders may operate jointly to move each of the moveable gates between the first open position and the second restricted position, and a first pneumatic cylinder operates to move each of the moveable gates between the first open position and the third further restricted position. In this manner, one of the cylinders operates to limit the range of motion of the other cylinder.

The mask mechanism of the present invention preferably includes at least one spring member operative to bias the pair of movable gates disposed on opposite sides of the rectangular opening toward the first open positions. This arrangement provides for the maximum dimension of the aperture to be the home position, and allows for simple contact-only connections between the cylinders and the gates.

Preferably, the mask mechanism also includes at least one shaft operative to maintain the alignment of the pair of movable gates as the gates move between various positions. In one embodiment, at least one shaft is fixedly attached to each of the gates and adapted to slide within a like-dimensioned cylindrical chamber to maintain the alignment of the gates. Alternatively, the at least one shaft may be fixedly attached to the plate member and a shaft engaging block, which is operative to slidable engage the at least one shaft, may be attached to each of the gates. In either embodiment, the shaft is aligned in a direction parallel to the direction of movement of the gates and operates to maintain the rectangular nature of the exposure aperture by maintaining the parallel alignment of the linear outer edges of the gates.

BRIEF DESCRIPTION OF THE DRAWINGS

These and other objects and aspects of the invention will become apparent in the detailed description of the invention hereinafter with respect to the drawings in which.

DETAILED DESCRIPTION OF THE PREFERRED EMBODIMENT

Typical photographic printers include several exposure apertures through which light is cast during the exposure process. These apertures further establish the dimensions of available negative or photographic paper space. The present invention provides a mask mechanism for dimensionally adjusting one or more of these exposure apertures while the photographic printer is operating.

Photographic printers typically include a source of light which operates to project light through the selected negative image positioned by a negative feed and holder assembly, through a lens, or group of lenses, in a lens deck onto a portion of an elongated web of light sensitive photographic paper. This arrangement provides several exposure apertures, such as apertures associated with the negative holder arrangement and photographic paper holder arrangement. Typically, the mask mechanism would take the form of a negative cropping riser block or a photographic paper mask assembly. In this manner, either, or both, the exposure aperture associated with the negative or the exposure aperture associated with the photographic paper as it relates to the overall photographic printer can be controlled, respectively.

In general, the mask mechanism includes a substantially planar plate member which defines a substantially rectangular opening therethrough. A pair of movable gates are disposed on opposite sides of the rectangular opening. Each gate includes a substantially linear outer edge, oriented parallel with the edge of the other gate, to maintain the rectangular nature of the exposure aperture. The gates are typically disposed within, or substantially coplanar with, the plate member inside the rectangular opening to minimize overall width and allow the plate member to be used, at least in part, to maintain the alignment of the gates. At least one pneumatic cylinder operates to move the gates between a first open position and a second restricted position. This arrangement allows the dimension between the opposed sides of the rectangular opening, having the movable gates associated therewith, to vary between an enlarged dimension, when the gates are disposed in the first open position, and a diminished dimension, when the gates are disposed in the second restricted position. The dimension of the exposure aperture between the opposed sides of the rectangular opening not having the movable gates associated therewith remains constant.

Negative Cropping Riser Block

Figure 1:
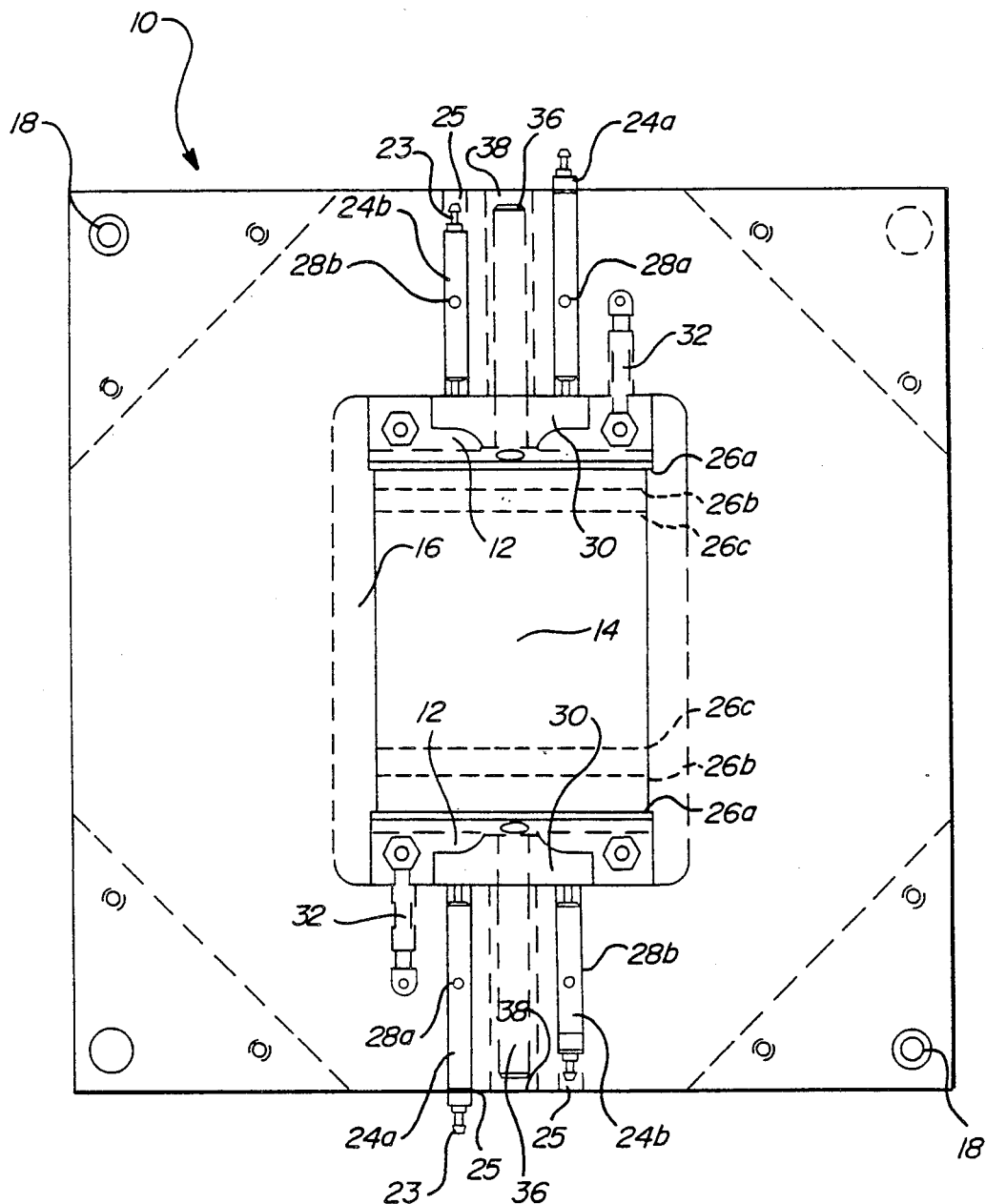
FIG. 1 is a top view of a negative cropping riser block having an adjustable aperture according to the present invention.
Figure 2:
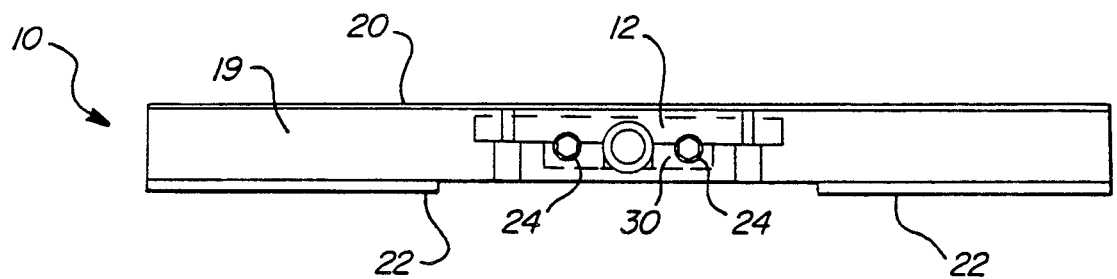
FIG. 2 is a side view of a negative cropping riser block having an adjustable aperture according to the present invention.
Figure 3:
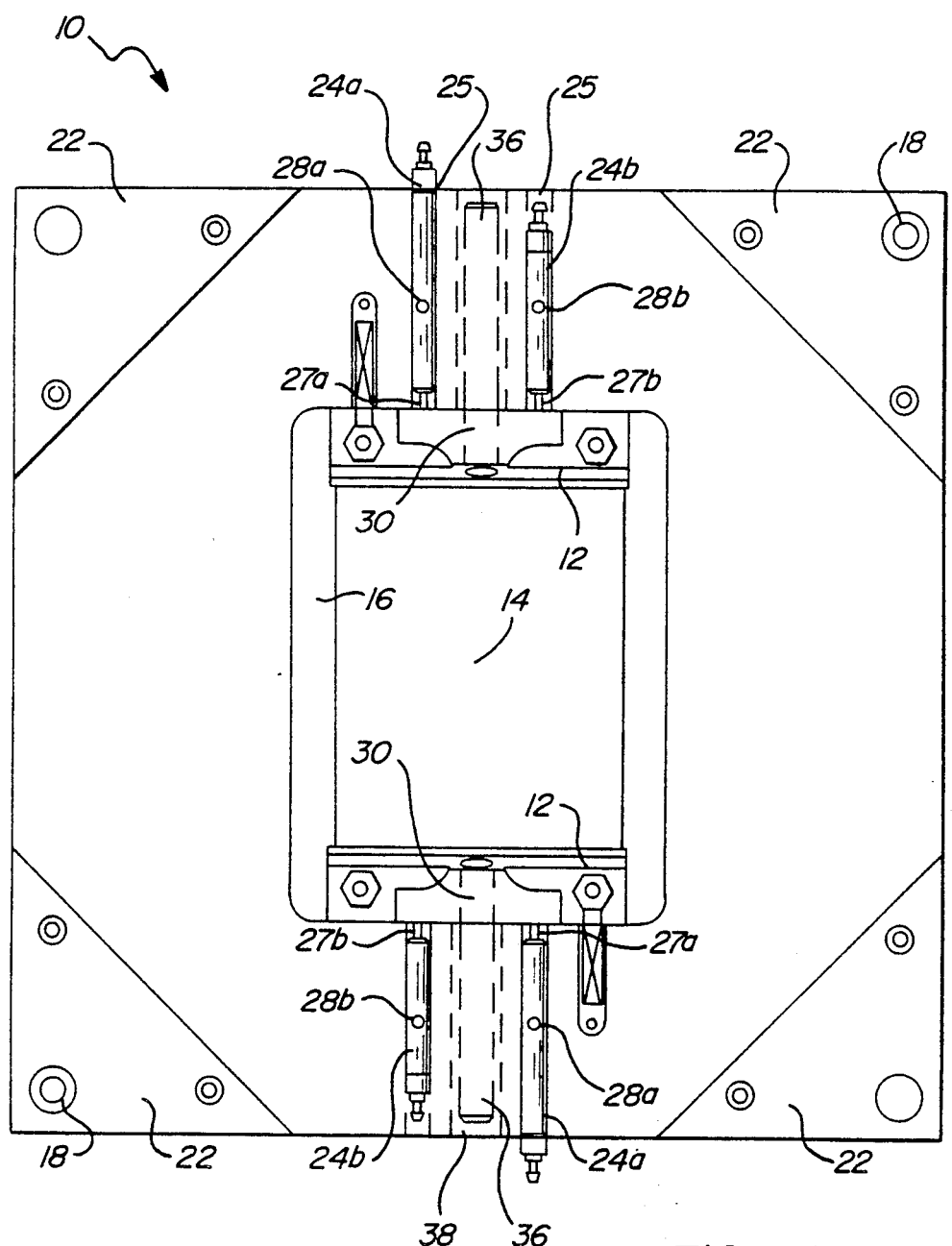
FIG. 3 is a bottom view of a negative cropping riser block having an adjustable aperture according to the present invention.

With reference to FIGS. 1 through 3, in one embodiment of the present invention the mask mechanism takes the form of a negative Cropping riser block 10. A pair of opposed blades or gates 12 are positioned on opposite sides of a rectangular opening 14 associated with a depression 16 in the back of the riser block 10. The riser block 10 is positioned on a package printer using diagonally opposed guide holes 18 to engage positioning pins on the printer. A riser block on package printers is typically five-eigths of an inch thick. To maintain this height, the present riser block 10 is formed from a one-half inch rigid body 19, having a one-thirty-second inch metal face 20, and three-sixteenth inch rigid corner leg members 22. In this manner, the riser block 10 rests on leg members 22 aligned by the holes 18, so that the negatives may be transported over the face 20 in alignment with the rectangular opening 14 at the appropriate position in the printer. The depression 16 allows the gates 12 to be positioned in close proximity immediately below the face 20 so as to minimize gaps between the gates 12 and negative which would allow light to be transmitted beyond the edges of the gates 12.

The gates 12 are preferably adapted to positively move between a plurality of positions. Several pneumatic cylinders 24 associated with each gate 12 operate to accomplish this feature. Each cylinder 24 has an inlet port 23 for attachment to a source of compressed air (not shown) and is controlled in conventional fashion. Two pneumatic cylinders 24 associated with each gate 12 operate to move the respective gate 12 between a first open position 26a, a second restricted position 26b, and a third further restricted position 26c.

The first cylinder 24b of the two pneumatic cylinders 24 is secured in a cylindrical chamber 25 in body 19 by set screw 28b and includes an output end member 27b adapted to bear upon a gate block 30 attached to each gate 12. The first cylinder 24b operates to move each of the moveable gates between the first open position 26a and the second restricted position 26b. A second pneumatic cylinder 24a of the two pneumatic cylinders 24 is secured in a cylindrical chamber 25 in body 19 by set screw 28a and includes an output end member 27a also adapted to bear upon the gate block 30 attached to each gate 12. The second cylinder 24a has a longer effective throw length than the first cylinder 24b, and operates to move each of the moveable gates 12 between the first open position 26a and the third further restricted position 26c. In this manner, each cylinder 24 operates independently of the other cylinders.

By way of example for three aperture sizes of 6×7 cm, 6×6 cm, and 6×5.5 cm (typically associated with 120 size negative film), the open position 26a would maintain a 6×7 cm aperture. When a 6×6 cm aperture was required, each of the gates 12 would move toward one another one-half cm to reduce that overall dimension by one cm. Thus cylinders 24b would have an effective throw length of one-half cm each. Correspondingly, to move from the 6×7 cm open position 26a to the 6×5.5 cm most restrictive position 26c, each second cylinder 24a would have a three-quarter cm effective throw to reduce the overall dimension by 1.5 cm.

The mask mechanism 10 of the present invention preferably includes a pair of spring members 32 disposed within separate cylindrical chambers 34 in body 19, which are operative to bias the pair of movable gates 12 disposed on opposite sides of the rectangular opening 14 toward the first open positions 26a. The spring members 32 are attached at one end to the rear surface of the chambers 34 and at the other end to the gates 12. The spring members are stretched between these two attachment points and are further stretched upon movement of the gates 12. Since the output of the cylinders only bear on the blocks 30, the spring members 32 effectively bias the gates toward the first position 26a when the cylinders are inactive. This arrangement provides for the maximum dimension of the aperture to be the home position, and allows for the simplified contact-only connections between the cylinders 24 and the gates 12, as previously discussed.

The mask mechanism also includes at least one shaft 36 operative to maintain the alignment of the pair of movable gates 12 as the gates 12 move between the various positions. A shaft 36 is fixedly attached to each of the gates 12 by a mechanical connection between the shaft 36, block 30, and gate 12. The shaft 36 is adapted to slide within a like-dimensioned cylindrical chamber 38 in the body 19 to maintain the alignment of the gates 12. The chamber 38 is disposed perpendicular to the linear near edge of the rectangular opening 14, and the shaft 36 is oriented perpendicularly to the linear outer edge of the associated gate 12. In this fashion, the shaft maintains the parallel relationship between the linear edge of the rectangular opening and the linear outer edge of the gate 12. This maintains the edges of the gates 12 parallel to one another as the gates 12 move within the mechanism.

The negative cropping riser block 10, therefore, operates to crop extra light from passing through portions of the negative which do not contain an exposed image. Further, it is operative during the printing process to vary in dimension to suit negatives of varying size.

Photographic Paper Mask Assembly

Figure 4:
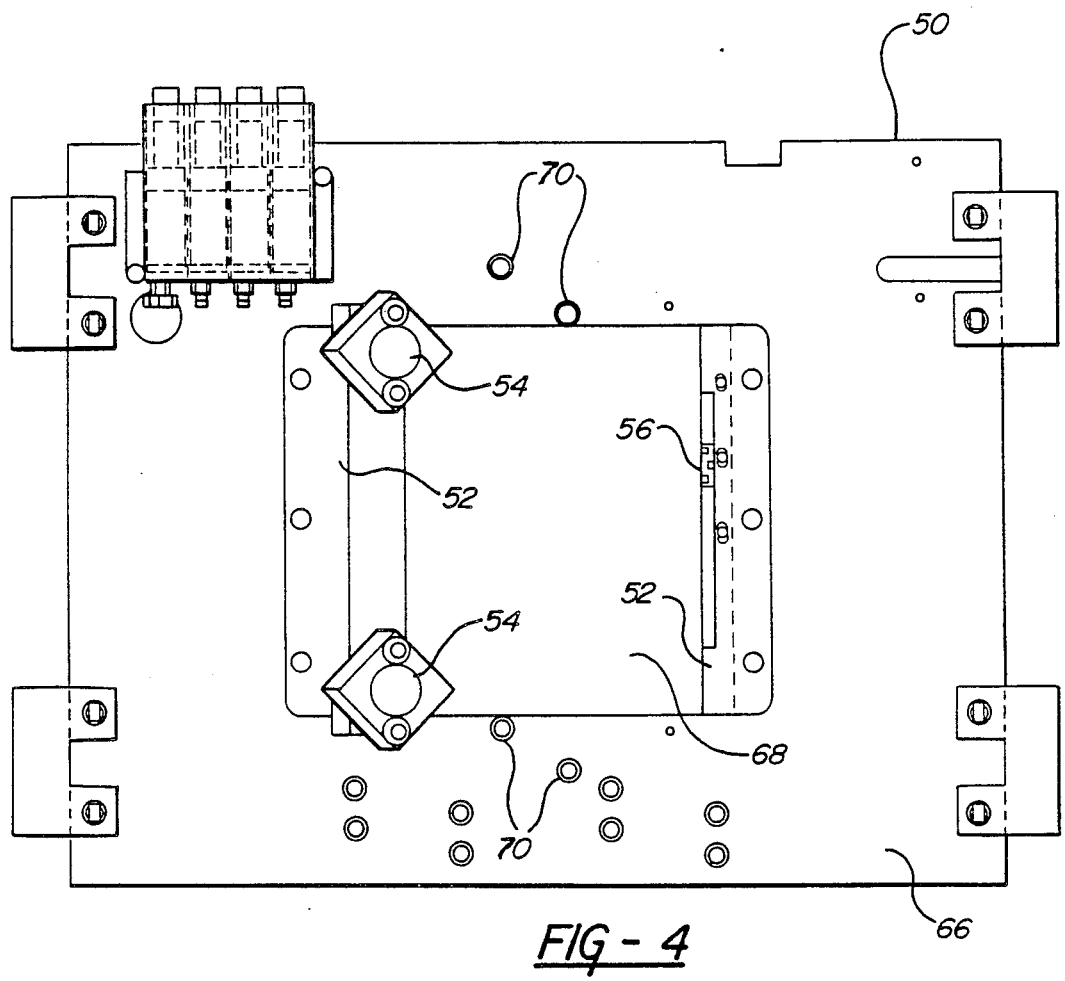
FIG. 4 is a top view of a photographic paper mask assembly having an adjustable aperture according to the present invention.
Figure 5:
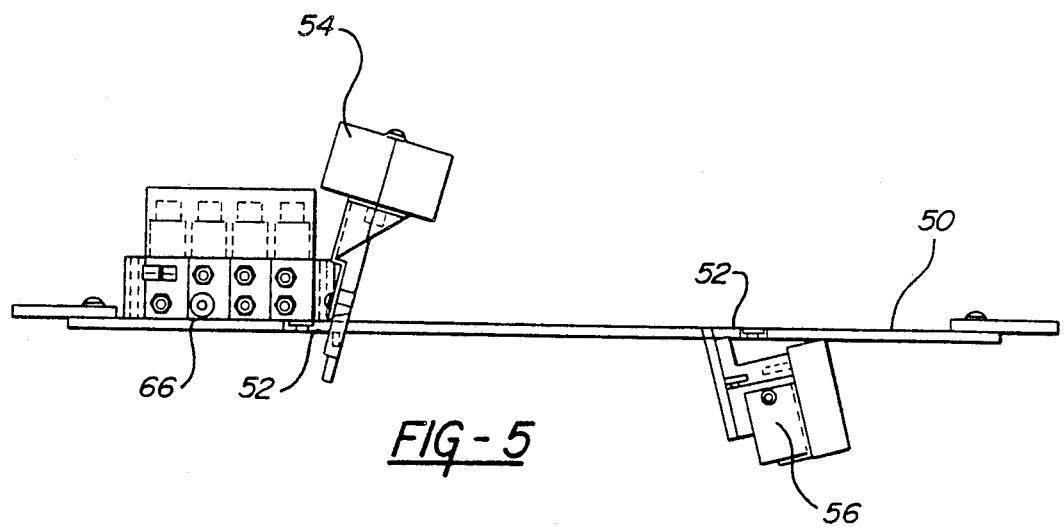
FIG. 5 is a side view of a photographic paper mask assembly having an adjustable aperture according to the present invention, said side view does not show the bottom cylinder mechanisms for reasons of clarity.
Figure 6:
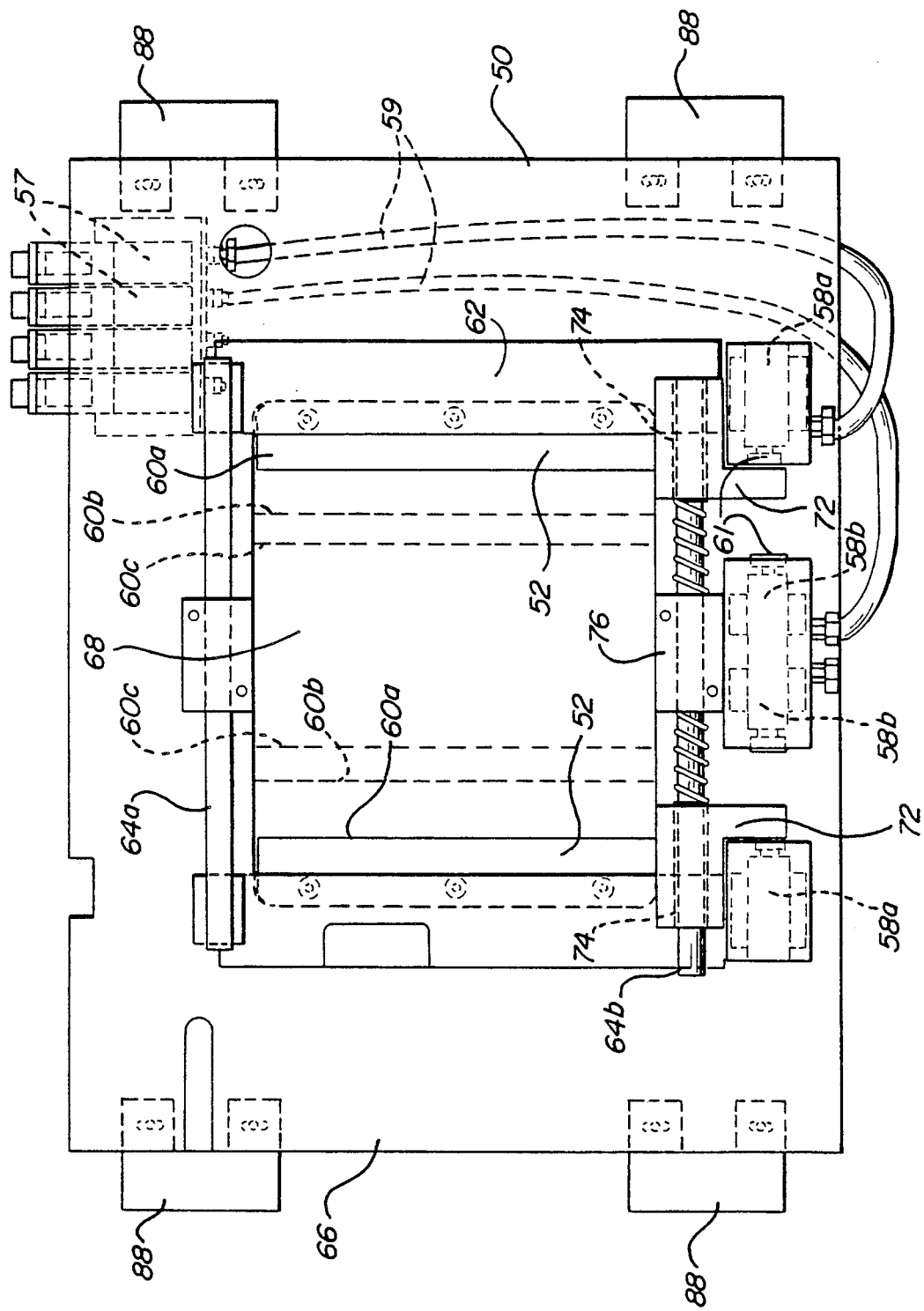
FIG. 6 is a bottom view of a photographic paper mask assembly having an adjustable aperture according to the present invention.
Figure 7:
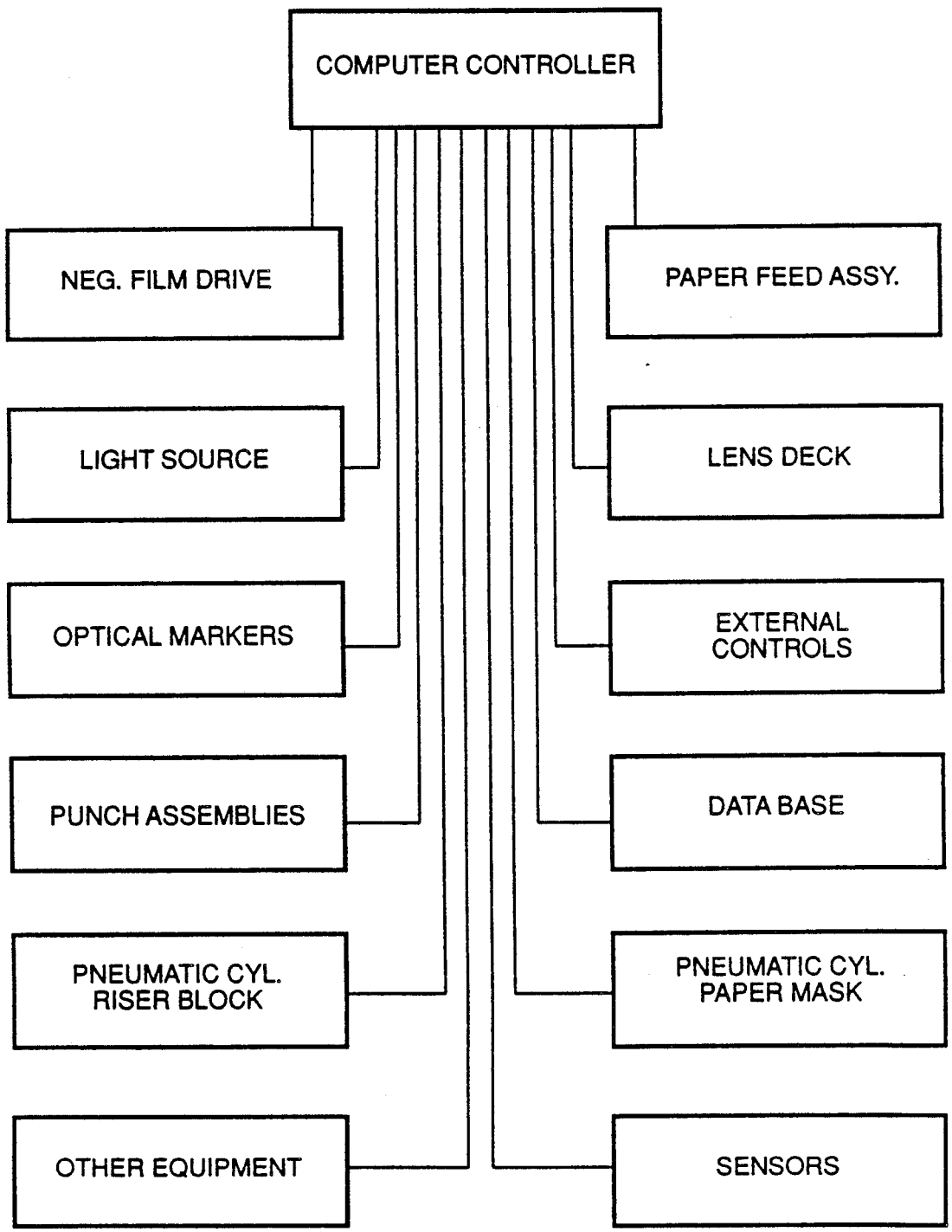
FIG. 7 is a diagram of a control system for a photographic printer using the present invention.

Alternatively and with reference to FIGS. 4 through 6, the present invention can be configured as a photographic paper mask assembly 50. In this manner, the exposure aperture associated with the photographic paper as it relates to the overall photographic printer can be controlled.

When the mask mechanism takes the form of a photographic paper mask assembly 50, one or both of the pair of movable gates 52 may be adapted to support a device for marking the photographic paper relative to the exposed prints thereon. For example, a punch assembly 54 for marking the photographic paper with punch holes may be attached to a first gate 52 and an optical marker 56 for exposing the photographic paper with identifying information may be attached to the other of the gates 52. The holes may be placed on the photographic paper to indicate where prints are to be cut in a cutting machine, and visible marks may be placed on the paper to indicate customer and order data, color data, or other identification or processing information. This arrangement moves the marking devices 54,56 so as to automatically adjust the placement of the associated marks on the photographic paper in relation to the size of the print image being exposed. Thus, the marks are always a fixed distance from the edge of the exposed image without regard to the size of the photographic print image.

In the preferred embodiment, the gates 52 are again adapted to positively move between a plurality of positions. Several pneumatic cylinders 58 operate to accomplish this feature. At least two pneumatic cylinders 58 operate to move each of the moveable gates 52 between a first open position 60a, a second restricted position 60b, and a third further restricted position 60c. (These cylinders 58 may take any form of commercially available pneumatic device, and can have a body section 57 attached to a remote location on the plate member 66 which operates through hoses 59 to adjust the position of cylinder output 61 so as to accommodate placement in a confined environment. These cylinders will be referred to generally as cylinders 58.)

Each gate 52 is attached to a frame member 62 so as to position the gates substantially coplanar with the plate member 66. The frame member 62 associated with each gate is slidably disposed between a pair of shafts 64 disposed on one side of the plate member 66. The shafts 64 are positioned parallel with one another on opposed sides of the central rectangular opening 68, and are secured in this orientation by screw means 70 inserted through the opposite side of the plate member 66. The frame member 62 slides between the first shaft 64a and the plate member 66 at one end thereof. A shaft engagement block 72 having suitable bearing means 74 is attached to the other end of the frame member 62 and engages the other shaft 64b to provide for positive engagement and positioning of the gates 52 relative the plate member 66. A pair of spring members are associated with the second shaft 64b so as to bear upon a centrally disposed block 76 and each of the shaft engagement blocks 72. This spring arrangement biases the gates 52 toward the first open position 60a.

A plurality of pneumatic cylinders cooperate to controllably move the gates between the plurality of positions 60a, 60b, 60c. For example, a first pneumatic cylinder 58a of the two pneumatic cylinders 58 associated with each gate 52 operates to move the respective gate between the first open position 60a and the third further restricted position 60c. The first and second pneumatic cylinders 58a, 58b of the two pneumatic cylinders 58 associated with each gate 52 operate jointly to move each of the moveable gates 52 between the first open position 60a and the second intermediate restricted position 60b. In this manner, one of the cylinders 58 operates to limit the range of motion of the other cylinder 58.

More specifically and by way of example, for three paper mask aperture sizes typically associated with proof printing of 5×5 inch, 4×5 inch, and 3.5×5 inch, the open position 60a would maintain the 5×5 inch paper mask aperture. When a 3.5×5 inch mask aperture was required, each of the gates 12 would be moved three-quarters of an inch to reduce the respective dimension by 1.5 inches overall to the further restricted position 60c. Thus, cylinders 58a have an effective throw length of three-quarters of an inch each. Correspondingly, to move from the 5×5 inch open position 60a to the 4×5 inch restrictive position 60b, each cylinder 58b, having an output end one-quarter inch from the end of the maximum throw of the cylinders 58a, extends one-half inch to interrupt the three-quarter inch throw of cylinders 58a and to reduce the effective throw of cylinders 58a by one-quarter inch. Thus, an effective overall motion of one-half inch each is achieved, and the overall aperture dimension is only reduced by one inch.

The shafts 64 operate to maintain the alignment of the pair of movable gates 52 as the gates 52 move between the various positions. The shafts are aligned in a direction parallel to the direction of movement of the gates and operate to maintain the rectangular nature of the exposure aperture by maintaining the parallel alignment of the linear outer edges of the gates 52.

The paper mask assembly 50 may be formed of any overall shape which is required for a given printer. By way of example, the mask shown would have a plate member with an 11×14 inch profile so as to be adapted toward placement in a paper window of a package printer. Tab members 88 operate to engage the printer and support the mask in place. This configuration effectively allows the use of a package printer for proof type applications, i.e. the production of a single 3.5×5 inch, 4×5 inch, or 5×5 inch photographic print for use to initially verify the correct exposure levels for a given negative.

In any configuration, the paper mask assembly 50, therefore, operates to crop areas of the available exposure to provide prints of various cropped dimensions. Further, it is operative during the printing process to vary in dimension to suit prints of varying size.

OPERATION OF THE INVENTION

The present invention is uniquely susceptible to an automated environment. A central computer controller can utilize input from sensors, data bases, or external controls adapted for photographic printer operator input, such as keyboards and the like. The controller is likely already operative to control such aspects as the film drive, paper feed assembly, light source, optical markers, punch assemblies, lens decks, and the like. Now, the controller can also coordinate the use of the present invention in the form of the negative riser block and/or paper mask assembly. Thus, the entire photographic printing process of various dimensioned negatives and prints can then be automatically controlled by the central controller.

For example, size 120 negative film may be exposed with 6×7 cm, 6×6 cm, 6×5.5 cm, and 6×4.5 cm negative images depending on the type of camera and related camera apertures. These negatives may be spliced together regardless of the dimensions of the negatives or the dimensions of the required prints. As the negatives cycle through the photographic printer, an operator can determine the appropriate riser block aperture and paper mask aperture settings. Then, by feeding in appropriate commands, depending on the control system setup, an air valve manifold (not shown) may be operated to activate the pneumatic cylinders associated with the gates of the riser block and/or the paper mask to produce the required aperture dimensions associated therewith.

Alternatively, sensors and/or data information may be utilized to minimize the need for an operator to interact with the photographic printer during the printing process. Sensors could be positioned to determine the edges of the negative image so as to determine the related size or could be positioned to locate and read codes punched into the side of the negative film. The code could be punched into the edge of the negative film which would either a) directly indicate the required negative and/or paper aperture sizes, or b) indirectly relate a negative or group of negatives to data stored in a database which would indicate the required negative and/or paper aperture sizes. Such information could be logged into the system at a more convenient, off-printer location and time. In either event, it can be seen that the present invention can be quickly adapted for use in an automated environment.

The rectangular opening 14 is typically centrally mounted on the mask; however, the mask could be formed in any manner such that the combination of elements provides an effective aperture for the printing process. Thus, the mask could be formed in a variety of sections, such as rectangular strips or C-shaped bodies, which would cooperate with the gates to form a proper aperture.

Many alternative methods of positioning the cylinders may envisioned so that at least a part of the time the cylinders act in concert with one another. For example, a first pneumatic cylinder of the at least two pneumatic cylinders may operate to move each of the moveable gates between the first open position and the second restricted position, and first and second pneumatic cylinders of the at least two pneumatic cylinders may operate jointly to move each of the moveable gates between the first open position and the third further restricted position. In this manner, the cylinders cooperate to extend the range of either individual cylinder.

From the foregoing description of the preferred embodiment it can be seen that various alternative embodiments of the invention can be anticipated without departure from the scope of the invention as defined in the following claims.

I now claim:

1. A mask mechanism for dimensionally adjusting an exposure aperture of a Photographic printer, comprising:
    a substantially planar plate member having at least one rectangular opening therethrough;
    a pair of movable gates disposed on opposite sides of said rectangular opening; and
    at least one pneumatic cylinder operative to move each of said moveable gates between a first open position and a second restricted position, whereby the dimension of said exposure aperture between the opposed sides of said rectangular opening having the movable gates associated therewith varies between an enlarged dimension when said gates are disposed in said first open position and a diminished dimension when said gates are disposed in said second restricted position and the dimension of said exposure aperture between the opposed sides of said rectangular opening not having the movable gates associated therewith remains constant.

2. The mask mechanism of claim 1, wherein said mask mechanism comprises a negative cropping riser block.

3. The mask mechanism of claim 1, wherein said mask mechanism comprises a photographic paper mask assembly.

4. The mask mechanism of claim 3, wherein one of said pair of movable gates disposed on opposite sides of said rectangular opening is adapted to support at least one punch assembly for marking the photographic paper with punch holes.

5. The mask mechanism of claim 3, wherein one of said pair of movable gates disposed on opposite sides of said rectangular opening is adapted to support at least one optical marker for encoding the photographic paper with identifying information.

6. The mask mechanism of claim 1, wherein said moveable gates are disposed substantially coplanar with said plate member.

7. The mask mechanism of claim 1, wherein each of said moveable gates defining a substantially linear outer edge, said substantially linear outer edges being oriented substantially parallel to one another to maintain the rectangular nature of the exposure aperture.

8. The mask mechanism of claim 1, wherein at least two pneumatic cylinders operate to move each of said moveable gates between a first open position, said second restricted position, and a third further restricted position.

9. The mask mechanism of claim 8, wherein a first cylinder of said at least two pneumatic cylinders operates to move each of said moveable gates between said first open position and a second restricted position, and a second pneumatic cylinder of said at least two pneumatic cylinders operates to move each of said moveable gates between said first open position and said third further restricted position.

10. The mask mechanism of claim 8, wherein a first pneumatic cylinder of said at least two pneumatic cylinders operates to move each of said moveable gates between said first open position and said second restricted position, and first and second pneumatic cylinders of said at least two pneumatic cylinders operate jointly to move each of said moveable gates between said first open position and said third further restricted position.

11. The mask mechanism of claim 8, wherein first and second pneumatic cylinders of said at least two pneumatic cylinders operate jointly to move each of said moveable gates between said first open position and said second restricted position, and a first pneumatic cylinder operates to move each of said moveable gates between said first open position and said third further restricted position.

12. The mask mechanism of claim 1, wherein said mask mechanism further includes at least one spring member operative to bias said pair of movable gates disposed on opposite sides of said rectangular opening toward said first open positions.

13. A mask mechanism for dimensionally adjusting an exposure aperture of a photographic printer, comprising:
    a substantially planar plate member having at least one rectangular opening therethrough;
    a pair of movable gates disposed on opposite sides of said rectangular opening, said gates being operative to move between a first open position and a second restricted position;
    at least one spring member associated with each said moveable gate, each said spring member being operative to bias each of said pair of movable gates toward said first open position; and
    at least one pneumatic cylinder associated with each said moveable gate, each said cylinder being operative to move each of said moveable gates between said first open position and said second restricted position, whereby the dimension of said exposure aperture between the opposed sides of said rectangular opening having the movable gates associated therewith varies between an enlarged dimension when said gates are disposed in said first open position and a diminished dimension when said gates are disposed in said second restricted position and the dimension of said exposure aperture between the opposed sides of said rectangular opening not having the movable gates associated therewith remains constant.

14. The mask mechanism of claim 13, wherein said mask mechanism comprises a negative cropping riser block.

15. The mask mechanism of claim 13, wherein said mask mechanism comprises a photographic paper mask assembly.

16. The mask mechanism of claim 15, wherein one of said pair of movable gates disposed on opposite sides of said rectangular opening is adapted to support at least one punch assembly for marking the photographic paper with punch holes.

17. The mask mechanism of claim 15, wherein one of said pair of movable gates disposed on opposite sides of said rectangular opening is adapted to support at least one optical marker for encoding the photographic paper with identifying information.

18. The mask mechanism of claim 13, wherein said moveable gates are disposed substantially coplanar with said plate member.

19. The mask mechanism of claim 13, wherein at least two pneumatic cylinders are associated with each said moveable gate, said at least two pneumatic cylinders being operative to move each of said moveable gates between a first open position, said second restricted position, and a third further restricted position.

20. The mask mechanism of claim 19, wherein a first cylinder of said at least two pneumatic cylinders operates to move each of said moveable gates between said first open position and a second restricted position, and a second pneumatic cylinder of said at least two pneumatic cylinders operates to move each of said moveable gates between said first open position and said third further restricted position.

21. The mask mechanism of claim 19, wherein a first pneumatic cylinder of said at least two pneumatic cylinders operates to move each of said moveable gates between said first open position and said second restricted position, and first and second pneumatic cylinders of said at least two pneumatic cylinders operate jointly to move each of said moveable gates between said first open position and said third further restricted position.

22. The mask mechanism of claim 19, wherein first and second pneumatic cylinders of said at least two pneumatic cylinders operate jointly to move each of said moveable gates between said first open position and said second restricted position, and a first pneumatic cylinder operates to move each of said moveable gates between said first open position and said third further restricted position.

23. The mask mechanism of claim 13, wherein said mask mechanism further includes at least one shaft operative to maintain the alignment of the pair of movable gates as said gates move between said first open position and said second restricted position.

24. The mask mechanism of claim 23, wherein at least one shaft is fixedly attached to each said gate.

25. The mask mechanism of claim 23, wherein said at least one shaft is fixedly attached to said plate member; and
a shaft engaging block is attached to each said gate and is operative to slidable engage said at least one shaft.

26. A mask mechanism for dimensionally adjusting an exposure aperture of a photographic printer, comprising:
a substantially planar plate member having at least one rectangular opening therethrough;
a pair of movable gates disposed on opposite sides of said rectangular opening, each of said moveable gates defining a substantially linear outer edge, said substantially linear outer edges being oriented substantially parallel to one another to maintain the rectangular nature of the exposure aperture, said moveable gates being operative to move between a first open position and a plurality of restricted positions, said moveable gates further being disposed substantially coplanar with said plate member;
at least one shaft operative to maintain the alignment of the pair of movable gates as said gates move between said first open position and said second restricted position;
at least one spring member associated with each said moveable gate, each said spring member being operative to bias each of said pair of movable gates toward said first open position; and
a plurality of pneumatic cylinders associated with each said moveable gate, each said plurality of cylinders being operative to move each of said moveable gates between said first open position and said plurality of restricted positions, whereby the dimension of said exposure aperture between the opposed sides of said rectangular opening having the movable gates associated therewith varies between an enlarged dimension when said gates are disposed in said first open position and a diminished dimension when said gates are disposed in said second restricted position and the dimension of said exposure aperture between the opposed sides of said rectangular opening not having the movable gates associated therewith remains constant.

* * * * *